April 9, 1957  E. T. HOWES  2,788,510
SEISMIC PROSPECTING APPARATUS
Filed July 6, 1953  5 Sheets-Sheet 1
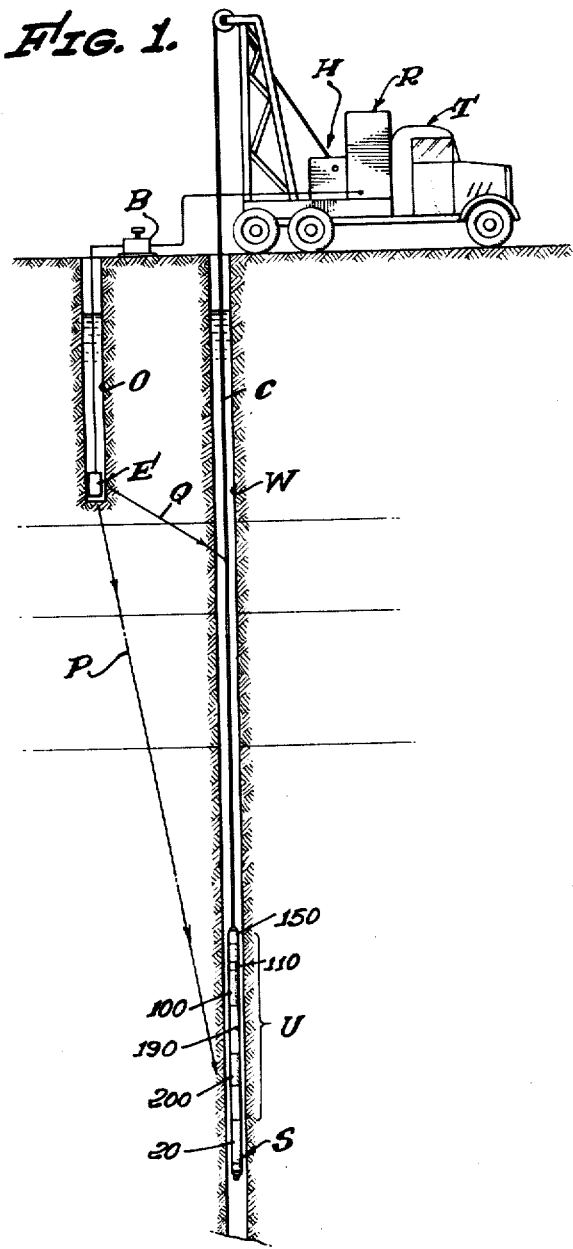
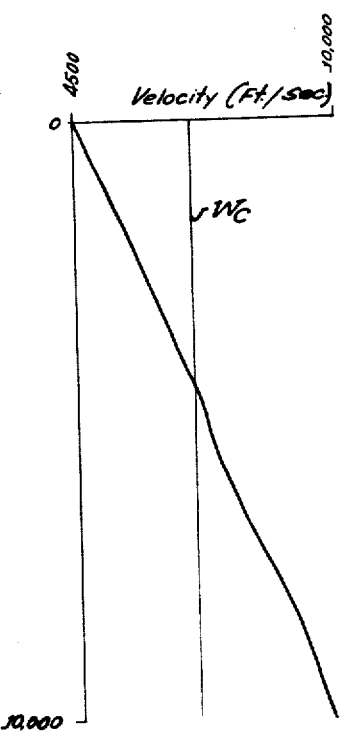
EDGAR T. HOWES,
INVENTOR.
BY Reed C. Lawlor
ATTORNEY.

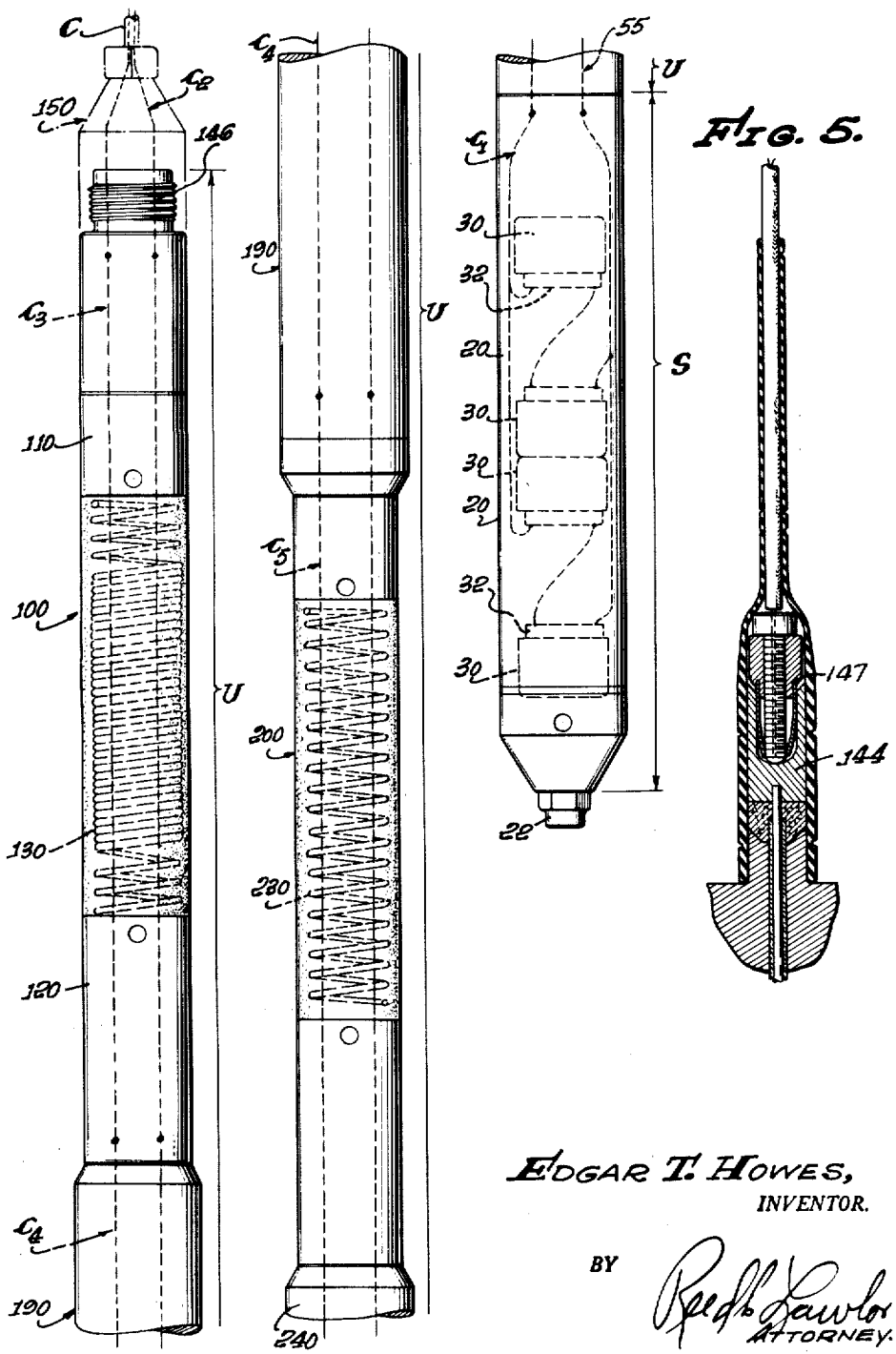

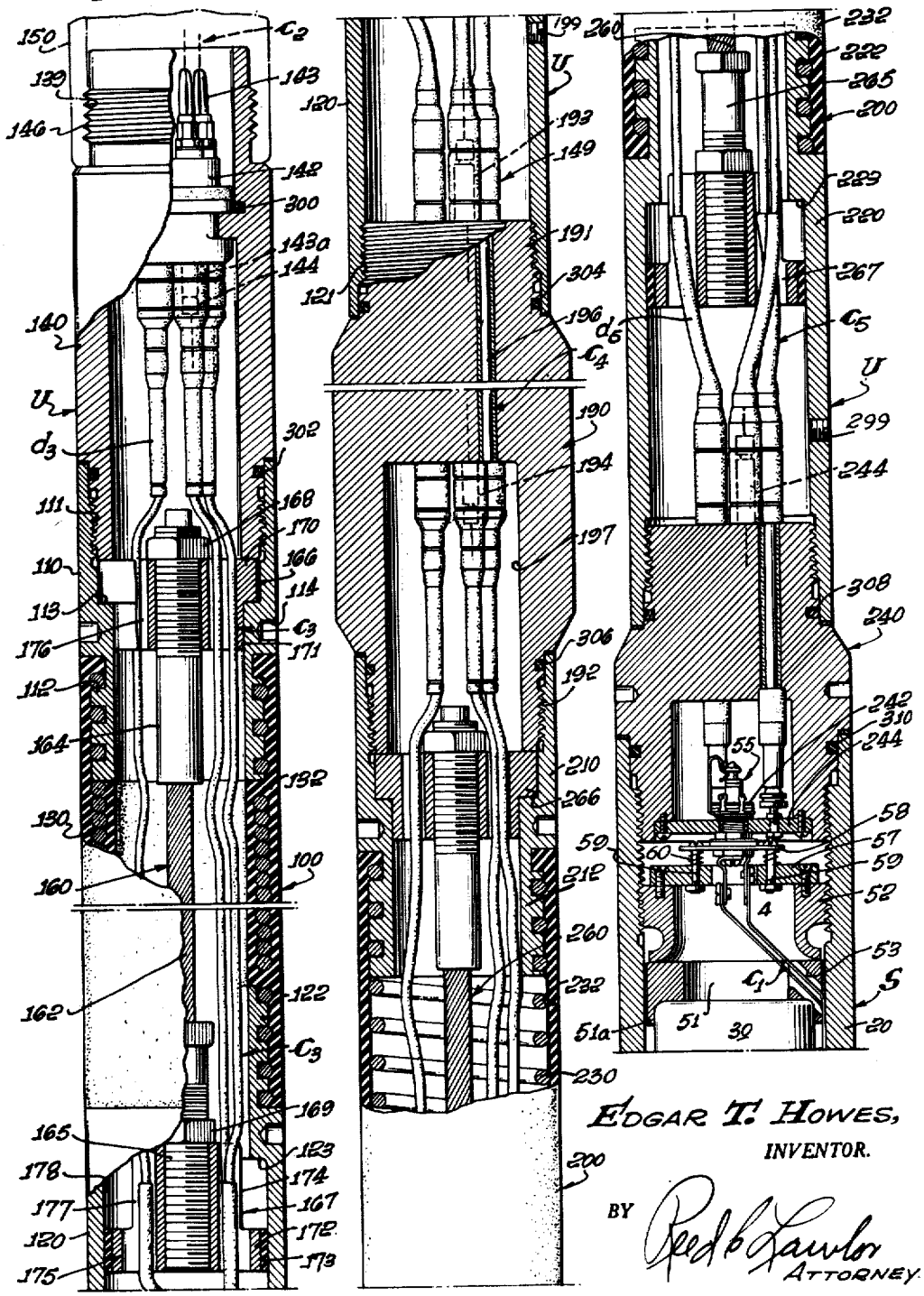

April 9, 1957 E. T. HOWES 2,788,510
SEISMIC PROSPECTING APPARATUS
Filed July 6, 1953 5 Sheets-Sheet 4
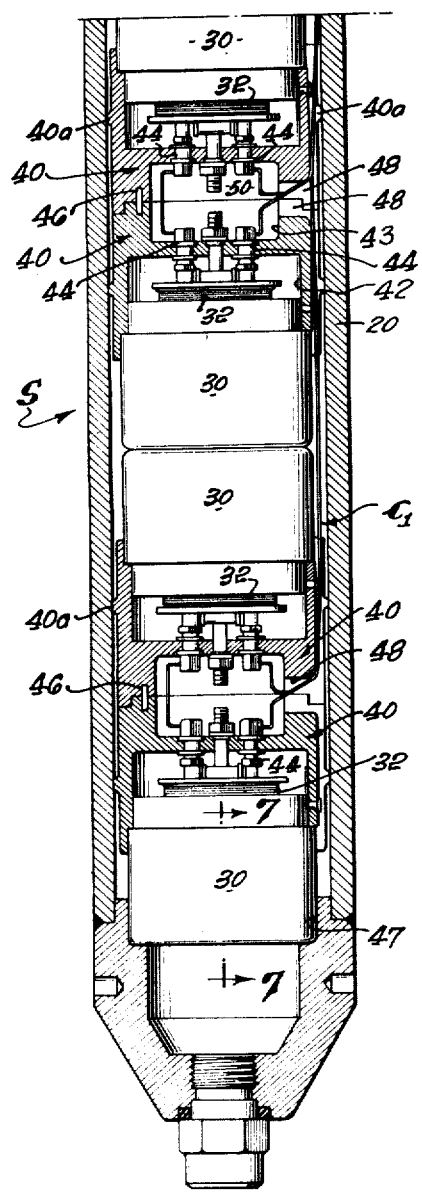
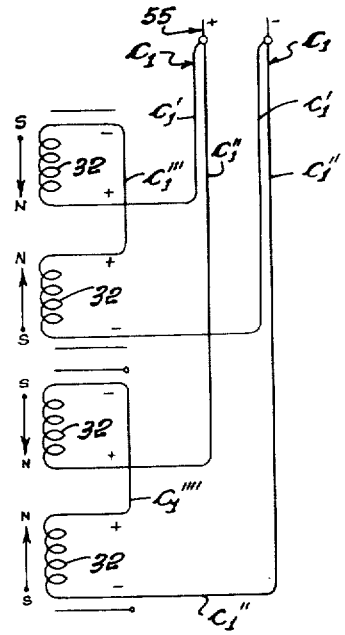
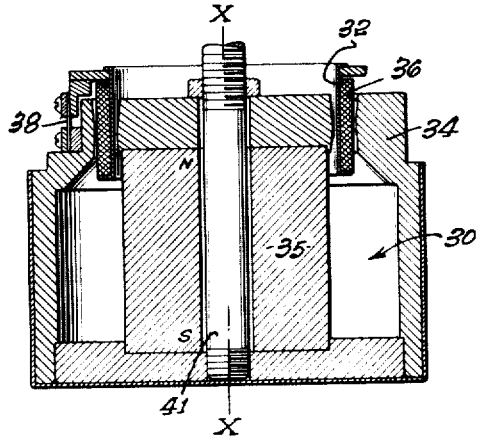
EDGAR T. HOWES,
INVENTOR.
BY
ATTORNEY

INVENTOR.
EDGAR T. HOWES,

United States Patent Office 2,788,510
Patented Apr. 9, 1957

1

2,788,510

SEISMIC PROSPECTING APPARATUS

Edgar T. Howes, Pasadena, Calif., assignor, by mesne assignments, to United Geophysical Corporation, Pasadena, Calif., a corporation of California Application July 6, 1953, Serial No. 366,271

22 Claims. (Cl. 340—17)

This invention relates to seismic prospecting and more particularly to improvements in apparatus for receiving seismic waves in a well. More particularly, the invention involves an improved coupling unit by means of which a seismometer is connected to the lower end of a cable from which it is suspended.

In the methods of seismic surveying generally employed, seismic waves are generated at various seismic wave generating stations adjacent the surface of the earth. The waves travel downwardly and, upon encountering various subterranean strata or other discontinuities, they are partially reflected, refracted, and diffracted back to the surface. The waves returned to the surface from such discontinuities are detected at various seismic wave receiving stations and records are made of the returned waves. The depth and the strike and dip of the strata that have reflected the waves and the location of other discontinuities, may be determined from the times required for the waves to travel from the various seismic wave generating stations to the discontinuities and thence to the seismic wave receiving stations and from the velocities with which the waves travel. The resultant survey of the subterranean formations determined from the records of the waves is employed to determine where petroleum is most likely to be found in the area surveyed.

In some instances, it is desirable to locate the seismometers in a receiver hole S drilled to some distance into the earth. Usually when such a method is employed, the seismometer is suspended in the hole by means of a cable supported from some point at the surface of the earth. Usually liquid fills the hole to a point near the surface.

It is well known that the velocity with which seismic waves travel in the earth varies from one formation to another, generally increasing but sometimes decreasing with increase in depth. The average velocity from the surface to a point at any depth varies considerably from one area to another. For this reason, to aid in making accurate seismic surveys, various methods have been devised for determining the average seismic wave velocity from a point adjacent the surface of the earth to other points at various depths.

In one method that has been widely employed heretofore for determining the seismic wave velocity as a function of depth, a seismometer has been suspended at various depths in a well and while the seismometer has been suspended at each depth, seismic waves have been generated at a point adjacent the surface of the earth. In this case too, the seismometer is generally suspended in the well by means of a cable supported by apparatus located at the surface of the earth. By measuring the time required for the seismic waves to travel from the shotpoint to the seismometer while located at the various depths, the average velocity of the seismic waves over the paths in question can be computed therefrom by well-known methods by taking into account the depth of the seismometer, the depth of the shotpoint and the spacing of the shotpoint laterally from the well.

Various types of seismometers are employed for detecting the seismic waves, both in the reflection seismic wave surveying system and in the well-shooting method described above. In any case, the seismometer is generally supported in the well or hole by means of a multiple-conductor cable extending downwardly from the surface of the earth.

The cable itself which supports the seismometer in the well or hole generally includes a plurality of mutually insulated conductors and even a central metal core in the form of a multiple-strand wire which is designed to give added strength to the cable. The conductors and the core are generally embedded in a filler and the entire arrangement is enclosed within a tubular insulating sheath of circular cross-section. The cable itself, for various reasons, is of flexible construction in order to facilitate its being fed into and withdrawn from a well.

In a velocity-sensitive seismometer an inertia member is resiliently suspended within a case and suitable means is provided for detecting relative movement of the case and the inertia member. With such a seismometer, the inertia member moves relative to the case in response to linear forces applied to the case by the seismic waves that reach the seismometer. Such a seismometer may be constructed, for example, by resiliently mounting a coil relative to a magnet and rigidly supporting the magnet relative to the case of the instrument. When seismic waves strike such a seismometer, the case is moved, causing relative motion between the coil and the magnet. Such relative motion induces a voltage in the coil. The resulting undulating voltage is transmitted through the cable to a recorder at the surface of the earth.

Another type of seismometer is pressure-sensitive. Such a seismometer includes elements which generate electromotive forces in response to changes in pressure of the fluid in which the seismometer is suspended. In this case likewise, when seismic waves reach the seismometer, pressure fluctuations that are created in the well fluid produce corresponding undulating voltages which are transmitted through the cable to a recorder at the surface. One type of pressure-responsive seismometer consists of a plurality of piezo-electric crystals which are embedded within the insulating sheath surrounding the cable and the piezo-electric crystals are suitably connected to the conductors in order to transmit the desired signals to the surface.

The inception of the change in the first wave to arrive when a set of seismic waves is generated is called the "first break." Other waves are called more generally seismic waves, sometimes being refracted waves, sometimes reflected waves, and sometimes even diffracted waves. It is important that the time of arrival of the "first break" be measured accurately in well-shooting and that the times of arrival of the waves be measured accurately in other forms of seismic prospecting. For this reason, it is generally intended that the seismometer shall accurately reproduce the seismic waves reaching the well from the surrounding formations.

In practice, it has been observed that the cable itself often transmits vibrations along its length to the seismometer. The waves that arrive at the seismometer by travelling along the length of the cable are called "cable waves." The inception of the first wave to arrive at the seismometer along such a path is sometimes referred to as a "cable break." Very frequently the velocity of transmission of cable waves along the length of the cable is higher than the velocity of travel of the seismic waves in the neighboring formations. For this reason, in well-shooting, the seismometer may receive vibrations that travel along the length of the cable before it receives seismic waves travelling directly to the seismometer through the earth. Under such conditions, it is often difficult, if not impossible, to measure accurately the time of arrival of the first break at the seismometer or the time of arrival of any other seismic waves that have travelled through the earth formation to the seismometer in the well. As a result, errors may occur in the determination of the seismic wave velocity.

Similar difficulties are encountered when a seismometer located in a receiver hole is employed in reflection seismic surveying. In this case, the cable waves interfere with the identification of reflected seismic waves, as well as first breaks. Thus, if cable waves are arriving at a seismometer at the same time that reflected seismic waves are arriving at the seismometer, the cable waves may so modify the shape of the waves recorded as to introduce inaccuracies in the determination of the times of arrival of reflected waves at any one seismometer and also errors in the relative times of arrival of the same seismic waves at various spaced seismometers.

In this specification, the application of this invention is illustrated with particular reference to a specific type of velocity-responsive seismometer. However, it will be understood that the invention is applicable to other types of velocity-responsive seismometers and also to any other seismometers which are sensitive to vibrations travelling thereto along the length of a cable, and, in fact, to any other instrument that may be disturbed by cable waves. Also, though the invention is described hereinbelow with particular reference to well-shooting methods, it is to be understood that it is also applicable to other methods in which seismic waves are to be detected and recorded.

According to this invention, a seismometer that is to be immersed in liquid in a well is mechanically connected to the end of a cable by means of a coupling unit that insulates the seismometer from the vibrations in the cable and which contains conductors for connecting the seismometer to the conductors in the cable. In one form of the invention, the coupler comprises a single resilient member which has a compliance which renders the natural frequency of vibration of the suspended seismometer low compared with the lowest frequency of any components of seismic waves which are to be detected and recorded. In effect, the resonant system constitutes a low-pass filter having a cut-off frequency about equal to the resonant frequency. In another form of the invention, the coupling unit comprises a series of alternately arranged resilient members and inertia members, thereby forming, in effect, a low-pass mechanical filter. In this case, the cut-off frequency of the mechanical filter, when considered with the seismometer connected at its end, is also low compared with the lowest frequency of any components of the seismic waves of interest. In both cases, the cut-off frequency is low compared with the frequency of the cable waves that are to be attenuated. With this arrangement, the various frequency components of the vibrations travelling along the length of the cable to the seismometer are highly attenuated before reaching the seismometer, the degree of attenuation increasing with frequency.

The novel features which are considered characteristic of the invention are set forth with particularity in the appended claims. The invention itself, however, both as to its organization and its method of operation, together with various features and advantages thereof, will best be understood from the following description of a specific embodiment thereof when read in connection with the accompanying drawings, in which:

Fig. 1 is a vertical cross-section of the earth in which a velocity survey is being made in a well;

Fig. 2 is a graph of seismic wave velocity as a function of depth;

Figs. 3a, 3b and 3c represent successive segments of a seismometer and a coupling unit, showing the general organization of the apparatus, some parts being shown in phantom;

Figs. 4a, 4b, 4c and 4d are detailed views, partly in cross-section, showing various parts of a seismometer and coupler;

Fig. 5 is a cross-sectional view of an electrical connector employed in the coupling unit;

Fig. 6 is a schematic wiring diagram showing connections of a plurality of seismic wave detectors;

Fig. 7 is a cross-sectional view of a seismic wave detector;

Figure 8:
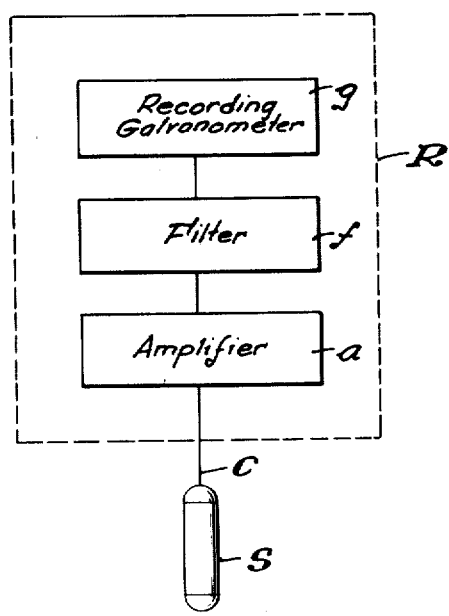
Fig. 8 is a block diagram of a single seismic wave reproducing and recording channel.

Referring to the drawings and particularly to Fig. 1, there is illustrated a section of the earth in which a well-velocity survey is being made. As illustrated there, a seismometer S is connected to a multiple-conductor cable C by means of a coupling unit U which provides both electrical connections and vibration insulation. The cable C is arranged to be raised and lowered in a well W by means of a hoist H on a motor truck T. As explained in more detail hereinafter, electrical conductors of the cable C are employed to transmit signals from the seismometer S to a recorder R on the truck T.

In order to make a measurement of seismic-wave velocity over a given distance, seismic waves are generated at the bottom of a shothole O and the waves are received by the seismometer S at some predetermined depth in the well W after the waves have been transmitted through various formations in the earth over a path P. In order to generate the seismic waves, a blaster B is operated to detonate a charge of explosive E at the bottom of the shothole O. At the time of detonation, a signal from the blaster B is transmitted to the recorder R, and a record is made of the instant of detonation of the charge of explosive E. When the waves that have travelled through the formations of the earth along the path P arrive at the seismometer S, corresponding electrical signals are generated in the seismometer. These electrical signals are transmitted upwardly through the coupling unit U and the cable C to the recorder R. Generally the recorder R includes an oscillograph or recording galvanometer for making the record. During the time interval between the detonation of the charge E and the recording of the waves received at the seismometer S, timer marks are made at regular known intervals on the record in a conventional manner in order to aid in measuring the travel time of the waves.

By measuring the time required for the waves to travel from the bottom of the shothole O to the depth of the seismometer S, the average velocity of the waves over the travel path P is readily determined by well-known methods. By making such determinations for different depth of the seismometer, a graph of seismic-wave velocity versus depth, such as that shown in Fig. 2, is obtained. Such graphs are helpful in the interpretation of records obtained in various seismic wave prospecting systems. In the graph illustrated in Fig. 2, average velocities ranging from forty-five hundred feet per second to ten thousand feet per second are shown. As indicated on the graph, some of these velocities are lower than the velocity Wc of waves that travel in the cable C, while others are larger than the cable-wave velocity.

In practice, it is observed that some waves arriving at the cable along a path Q travel to the seismometer S along the cable. These waves can be recognized by making records at various depths and noting the time of travel of the waves to the seismometer while at the various depths. If the waves have travelled to the seismometer along the cable C, they appear to travel to the seismometer while located at the various depths with a constant velocity equal to the cable-wave velocity Wc. Down to a certain depth at least, the cable waves arrive at the seismometer before the waves which travel thereto through the earth formations along the path P. Such waves interfere with the recording of the seismic waves if they do not entirely mask the latter waves. It will be understood, of course, that seismic waves striking the cable C after travel thereto along other paths than the path Q may cause the cable to vibrate and transmit such vibrations to the seismometer S at a later time.

According to the present invention, the coupling unit U is employed to eliminate or at least greatly reduce disturbances that might otherwise occur because of the travel of vibrations along the length of the cable C to the seismometer S.

In Figs. 3a, 3b, and 3c there is shown a general arrangement of a seismometer and coupling unit employed in this invention. Various details of the seismometer and the specific coupling unit illustrated are shown in Figs. 4a, 4b, 4c and 4d.

The seismometer S itself comprises a housing including a tubular member 20 in which four seismometer units 30 are mounted in a vertical line. The lower end of the tubular member 20 is closed by a threaded plug 22. Each of the seismometer units 30 includes a coil 32 which is arranged to generate electromotive forces corresponding in frequency and amplitude with the frequency and velocity of the fluid in which the seismometer S is immersed as more fully explained hereinbelow. As indicated in the schematic wiring diagram of Fig. 6, the four coils 32 are connected to conductors $c_1$ in such a way that all of the electromotive forces generated by the seismometer units 30 in response to movement of the seismometer are combined in an additive manner, but electromotive forces induced in the coils 32 by any changes in external magnetic fields are combined in a subtractive manner. Thus, the voltage appearing across the conductors $c_1$ varies in a manner corresponding to the undulations in the seismic wave entering the well at the depth of the seismometer S and is substantially free of any influences of external magnetic fields.

More particularly, as shown in Fig. 7, each of the seismometer units 30 comprises an armature 34 which contains a central magnet 35 that creates a magnetic field in an annular air gap 36. The coil 32 is resiliently suspended in the air gap 36 by means of a spring 38, the coil being adapted to move along a vertical or central axis of symmetry X—X passing through the center of the seismometer. As is well known, when the armature 34 vibrates along the vertical axis X—X, electromotive forces proportional to the instantaneous velocity of the seismometer unit 30 along that axis are generated across the ends of the coil 32. The four seismometer units 30 are mounted coaxially within the tubular member 20. Two of the seismometers are arranged in an anti-polar relationship with respect to the other two seismometers. Conveniently, the armatures of alternate seismometer units 30 may be reversed to achieve this result.

In order to align the seismometers and maintain them in a fixed physical relationship within the tubular member 20, each of the seismometers is connected to a spacer 40. Each of the spacers 40 is provided with an enlarged recess 42 on one side thereof and a reduced recess 43 on the other side thereof, the two recesses being of circular cross-section and being arranged coaxially therein. Each of the spacers 40 is secured to the corresponding armature 34 by means of a central bolt 41 extending into the seismometer unit.

Two insulated terminals 44 projecting longitudinally through each of the spacers 40 are connected to the opposite ends of the coil 32. Each of the spacers 40 is provided with radial projections 40a to facilitate centering of the various seismometer units in the casing 20 and the spacer elements 40 are provided with pins 46 to prevent relative rotation of abutting spacer elements 40. A lateral aperture 48 formed between abutting spacer elements 40 provides access to a cavity 50 formed therebetween, thereby facilitating making electrical connections between the conductors $c_1$ and the terminals 44.

The lowermost seismometer unit 30 fits snugly within a circular recess 47 formed in the bottom of the tubular member 20. A ring-shaped end spacer 51 formed with an axial flange 51a encircles the upper end of the uppermost unit 30.

A clamping ring 52 having a circular resilient extension on its lowermost end threadedly engages the upper end of the tubular member 20, being screwed into engagement with the end spacer 51, thereby resiliently clamping all of the seismometer units 30 and spacers 40 in a vertical array within the tubular member 20. The conductors $c_1$ extend through an inclined opening 53 in the end spacer 51 and extend downwardly along the internal surface of the tubular member 20, passing through the segmental spaces formed between the protrusions 44a. The various branches $c_1'$ and $c_1''$ of the conductors enter the apertures 48 and are connected to corresponding terminals 45. Conductors $c_1'''$ and $c_1''''$ are employed to complete the electrical connection between the coils 32.

The conductors $c_1$ terminate in a two-terminal jack 55 that extends upwardly from the upper end of the seismometer S. The jack 55 is resiliently mounted on an end ring 57 fastened to the upper end of the clamping screw 52. The jack is supported on the clamping screw 52 by means of a ring 58 having oversized holes encircling bolts 59, the ring being held in its upper position by springs 60.

Thus it is seen that with the seismometer S described above, there appear across the electrical terminals of the jack 55 electromotive forces which vary in time in a way that corresponds to the undulations of the seismic waves reaching the seismometer.

Referring again to Figs. 3a, 3b and 3c, it will be noted that the electromotive forces created in the seismometer S are transmitted through the coupling unit U to the conductors $c_2$ in the cable C by means of conductors $c_3$, $c_4$ and $c_5$ in the coupling unit U. As indicated in Fig. 8, when the output of the seismometer is applied to the recorder R, it is transmitted through an amplifier $a$ and filter $f$ and then impressed upon a recording galvanometer $g$.

The coupling unit U comprises an upper resilient member 100, an inertia member 190 and a lower resilient member 200. The two resilient members 100, 200, the inertia member 190 and the seismometer S form a continuous vertical string of elements at the bottom of the cable C. The two resilient members 100 and 200 are adapted to be extended and contracted vertically in response to vertical forces applied thereto. In effect, each of the resilient members 100 and 200 acts as a spring. As a result of the action of the resilient members 100 and 200 and the masses of the inertia member 190 and the seismometer S, any vertical vibrations reaching the bottom of the cable C are attenuated by the coupling unit U before reaching the seismometer.

Figure 9:
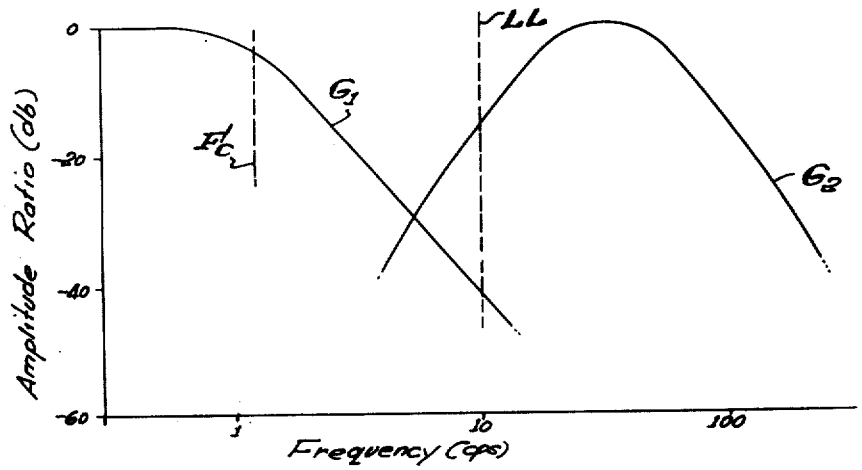
Fig. 9 is a graph showing a typical attenuation curve and a typical responsive curve.

It can be shown that the ratio of the velocity of the seismometer to the velocity of the bottom of the cable is unity at low frequencies compared with the cut-off frequency Fc, and is lower than unity at frequencies above the cut-off frequency, decreasing at high frequencies at a very high rate. Thus, below the cut-off frequency, there is a zero db loss, but at frequencies somewhat above the cut-off frequency Fc, the vibrations applied by the cable C to the seismometer S are highly attenuated. A typical curve $G_1$ of velocity ratio in db is illustrated in Fig. 9. Its relationship to a typical overall frequency response curve $G_2$ of a seismic wave channel including both the characteristic of the seismometer S and the recorder R, is also shown. The latter curve has band-pass characteristics and is characterized by a lower frequency limit LL of about 10 C. P. S. corresponding to the frequency of the lowest frequency components that are to be detected and recorded. Such a lower frequency limit LL exists on the low side of the pass band where the characteristic $G_2$ of the seismic wave channel is about 15 db below the maximum response.

If one of the resilient members 100 or 200 is omitted and the inertia member 190 is omitted, and also if the effects of viscosity are neglected, the resonant frequency of the suspended seismometer is expressed by the equation $$F_0 = \frac{1}{2\pi}\sqrt{\frac{K}{M}}$$

where K is the compliance of the resilient member 100 and M is the effective mass of the seismometer. But in the case where the two resilient members 100 and 200 have the same compliance K and the inertia member 190 and the seismometer S have the same effective mass M, then it can be shown that if the effect of viscosity is omitted, the system is characterized by two resonant frequencies, namely, $$F_1 = 1.65 F_0$$
$$F_2 = 0.62 F_0$$

In both cases the cut-off frequency is about the same, namely, $$Fc = F_0$$

In the first case mentioned, the attenuation above the cut-off frequency increases about 12 db per octave, but in the second case, it increases at about 24 db per octave. If even a larger number of resilient members and a larger number of inertia members are connected together in sequence, the attenuation increases at a much higher rate per octave increase of frequency.

Generally speaking, the effective masses of the seismometer and the inertia member in well fluid are somewhat greater than they are in air. For this reason, if the cut-off frequencies are computed for the mass in air, the actual cut-off frequencies in fluid will be somewhat less. Also, the viscosity resistance of the fluid reduces the cut-off frequency somewhat below the values determined in air. Thus, it is sufficient if the cut-off frequencies in air are set at the values mentioned. The difference between the actual value and the value as computed in that manner is in a direction favorable to attenuating the cable waves.

In a practical case, the two effective masses of the seismometer and the inertia member may be about sixty-five pounds and the force constants of the resilient members may be about eighty-two pounds per foot. In such a case, the cut-off frequency is about 1.0 C. P. S. This, it will be noted, is less than one-tenth of the frequency of the lowest frequency component that it would ordinarily be desired to detect and record.

In either case, in order to attenuate vibrations before they are applied to the seismometers S, a coupling member is employed which, in effect, is a low-pass mechanical filter having a cut-off frequency Fc which is considerably below the frequency of any component of the seismic waves that are to be recorded. For best results, the cut-off frequency or characteristic resonant frequency is made less than about one-tenth of the frequency of the lowest frequency components of the seismic waves that are to be recorded. In any event, by employing a coupling unit which possesses a cut-off frequency that is below the lowest frequency of the seismic waves that are to be recorded, vibrations that might otherwise be transmitted from the cable C to the seismometer S are attenuated highly.

As shown more clearly in Figs. 4a and 4b, the upper resilient coupling device 100 comprises an upper tubular member 110 and a lower tubular member 120 and also a resilient interconnecting coil spring 130 arranged coaxially therebetween. The upper end of the upper tubular member is provided with female threads 111 adapted to engage the male threads of a connector 140. The lower end of the upper tubular member is provided with large external square threads 112 to facilitate connection of the coil spring 130. The upper tubular member is also provided with an inwardly projecting portion forming an upwardly facing circular shoulder 113.

In a similar way, the lower tubular member 120 of the upper resilient coupling device 100 is provided with female threads 121 at its lower end for engaging corresponding threads at the upper end of the inertia member 190. The upper end of the lower tubular member is also provided with external square threads 122 to facilitate engagement of the spring 130 and the lower tubular member is provided with an inwardly projecting portion forming a downwardly facing shoulder 123.

As indicated above, the ends of the coil spring 130 are threaded onto the square threads 112 and 122 at the bottom and top, respectively, of the upper and lower tubular members 110 and 120. A flexible sleeve 132 composed of rubber or other similar material encloses the coil spring 130 in order to form a liquid-tight chamber between the upper and lower tubular members 110 and 120. In the form of the sleeve shown, the rubber is molded over the portions of the spring 130 which engage the threads 112 and 122, thus forming a tight connection between the ends of the spring 130 and the corresponding tubular members 110 and 120. Also, in this particular case, the body of the spring between the tubular members 110 and 120 is embedded in the rubber in the molding process. The force constants depend not only upon the strength and lengths of the springs 130 and 230, but also upon the characteristics and dimensions of the rubber sleeves 132 and 232. The spring 130 is initially preloaded so that adjacent helical turns of the spring exert an axial pressure against each other when the spring is not loaded. However, the degree of preloading is so selected that when a normal load hangs from the lower ends of the upper resilient coupler 100, the successive turns of the spring are spaced apart so that the spring provides equal values of compliance for both extension and contraction of the spring.

The head connector 140 is provided at its upper end with an electrical connector 142 in the form of a plug which carries on its upper side a plurality of upwardly projecting male terminals or prongs 143 and on its lower side a plurality of downwardly projecting female terminals or receptacles 144. Corresponding lower terminals 144 are connected to the upper terminals. The upper end of the head connector 140 is provided with an external male thread 146 to adapt it for firm connection to a socket 139 of a cable connector 150 that is suitably attached in conventional manner to the lowermost end of the cable C. The cable connector 150 includes a female connector (not shown) that is adapted to engage the upwardly projecting male terminals 143 in order to make electrical connection between the conductors $c_2$ in the cable C and other corresponding conductors carried within the coupling unit U.

Detachable male connector elements 147 engaging the female connector elements 144 are employed, as shown in Fig. 5, to connect the upper ends of conductors $c_3$ to the terminals 143 and hence to the conductors $c_2$ in the cable C. Similar female connector elements 149 are employed to connect the conductors $c_3$ to corresponding similar female connectors 193 that are arranged at the upper end of the inertia member 190. An extra conductor $d_3$, similarly arranged, is employed to provide a ground connection between the inertia member 190 and a grounded conductor in the cable C.

A stretch-limit member 160 is employed for limiting the extension to which the resilient member 100 may be subjected. The maximum permissible extension is greater than any that would be required for normal loads suspended from the lower end of the resilient member 100. However, it is less than the amount of stretch to which the resilient member 100 might be subjected when the instrument is being raised out of a well, particularly if either the inertia member 190 or the seismometer S becomes bound to the sidewall of the well. As shown in Fig. 4a, the resilient member 100 is fully contracted as though it were supporting no weight.

The stretch-limit member 160 comprises a multiple-strand metallic cable 162 provided with fasteners in the form of headless bolts 164 and 165 at the upper and lower ends thereof, respectively. Corresponding circular stop-nuts 166 and 167 threaded onto the outer ends of the respective bolts 164 and 165 are locked in place by means of locknuts 168 and 169. The upper nut 166 is provided at its upper end with a collar 170 which rests upon the shoulder 113 of the upper tubular member 110 and a reduced shank 171 which fits closely within but without binding the reduced portion of the upper tubular member 110 just below the shoulder 113.

The lower nut is provided at its lower end with a collar 172 which is encircled by a rubber ring 173, the collar and ring together forming a piston 175. The shank 174 formed at the upper end of the lower nut 167 has a substantially smaller diameter than the opening in the lower tubular member 120 above the shoulder 123 and is therefore free to move therein. Passages 176 and 177 extending longitudinally through the nuts 166 and 167 permit passage of the conductors $c_a$ through the nuts 166 and 167.

The upper nut 166 is clamped in place by the lower end of the connector 140. On the other hand, the lower stop-nut 167 is slidable within the cylinder 178 formed in the lower tubular member 120 beneath the shoulder 123, the length of the cable 162 between the stop-nuts 166 and 167 being sufficient to form a space between the piston 175 and the shoulder 123 when a normal load is hanging from the lower end of the resilient member 100.

The strength cable 162 is insulated from the lower tubular member 120 partly because of the sliding action of the piston in the sleeve and partly by virtue of the resiliency of the rubber ring 173. The rubber sleeve 132 damps out vibrations that tend to travel along the spring 130. For these reasons, vibrations that reach the upper tubular member 110 do not reach the lower tubular member 120, except insofar as they reach it through the action of the spring as a whole; that is, by virtue of the substantially uniform extension and contraction of the spring.

It is to be noted that the conductors $c_a$ are slack so that they do not interfere with the extension and contraction of the resilient coupling device 100.

The inertia member 190 is provided with male threads 191 and 192 at its upper and lower ends, respectively. Female terminals 193 and 194 secured to the upper and lower faces of the inertia member 190 are connected to opposite ends of conductors $c_4$ that extend therethrough. The female connectors 193 and 194 are of the same type as those illustrated in Fig. 5. For reasons which will become apparent hereinafter, the lower end of the inertia member 190 is provided with a hollow portion or circular recess 197.

The lower resilient coupling device 200 is similar in construction to the upper resilient coupling device 100 and differs therefrom primarily in the construction of the spring and the sleeve. Identical parts of the two resilient couplers 100 and 200 are similarly numbered, except that the former bear numbers in the 100 group while the latter bear numbers in the 200 group.

In the lower resilient coupling device 200 the coil spring 230 is not preloaded so that adjacent helical turns thereof are spaced slightly from each other when no load is applied. In this case, the sleeve 232 encircles the spring 230 and lies externally thereof, so that the spring 230 is not embedded in the sleeve 232. However, as in the case of the upper resilient coupler 100, the sleeve is molded over the portions of the spring that engage the square threads 212 and 222 on the lower and upper ends, respectively, of the upper and lower tubular members 210 and 220.

In this case too, the stretch-limit member 260 having an upper stop-nut 266 and a lower stop-nut 267 is employed. In this case, however, the upper stop-nut 266 is clamped in place by means of the lower end of the inertia member 190. In this case, conductors $c_5$ extending through passages of the stop-nuts 266 and 267 are connected electrically to the terminals 194 at the lower end of the inertia member and terminals 244 at the upper end of a bottom connector 240. Also an extra conductor $d_a$ similarly arranged provides a ground connection between the inertia member 190 and the bottom connector 240.

The bottom connector 240 is provided at its upper end with threads for engaging the lower end of the lower tubular member 220. At its lower end, it is provided with threads for engaging the uppermost end of the seismometer housing 20. At the lower end of the lower connector 240 there is mounted a female connecting element 242 upon an insulated plate 244. The female connecting element 242 is adapted to engage the jack 55 at the upper end of the seismometer S.

The spaces within the resilient coupling members 100 and 200, including the cavity in the connector 140 and the cavity at the lower end of the inertia member 190, are filled with oil or other suitable fluid through suitable lateral filling ports 199 and 299 in order to permit the sidewalls of the resilient members formed by the sleeves 132 and 232 to withstand the high pressures to which they are subjected when they are lowered to great depths in a well. O-rings 300, 302, 304, 306, 308 and 310 are employed to seal all of the interior cavities of the resilient couplers 100 and 200 and the interior of the seismometer S against leakage of well fluid thereinto.

With this arrangement, when completely assembled and connected to a cable C, the electrical output of the seismometer S is transmitted through the coupling unit U and the cable C to the recorder R on the truck T. After the seismometer S, coupling unit U and cable C have been assembled and are ready for use, they are lowered in the well W. Just before entering the well, the springs 132 and 232 are extended because of the weight of the parts hanging therefrom. As the seismometer is lowered into the well, the springs 132 and 232 contract somewhat, partly because of the loss of the effective weight of the inertia member 190 and the seismometer S while immersed in the well fluid, and partly because of the upward resistance presented by the fluid as the string of instruments is lowered in the well. When the instruments are finally brought to a depth at which a measurement is to be made, the pay-out of the cable C is discontinued, bringing the instruments to rest. When this occurs, the springs 132 and 232 extend slightly because of the removal of the resistance force previously offered by the liquid.

When seismic waves are generated by detonation of the explosive E, any waves travelling down the cable C are attenuated highly, thereby reducing any masking effect that they might have on the seismometer S. As explained above, the effectiveness of the coupling unit U increases with frequency. For this reason, the first break produced by the arrival of seismic waves at the seismometer S along the path P through the earth formations is readily distinguishable since the first break is relatively rich in high-frequency components and such components that may be present in waves transmitted along the length of the cable are very, very highly attenuated.

After a suitable record is obtained at any depth in the well, the string of instruments is then moved to another position in the well or removed therefrom. After a sufficient number of observations have been made over the depth range of interest, the cable C is withdrawn from the well.

As the cable begins to rise, the resilient couplers 100 and 200 are extended. If the drag on the inertia member 190 or on the seismometer S is sufficiently great, the pistons 175 and 275 at the lower ends of the stretch-limit members 160 and 260 engage the shoulders 123 and 223 in the lower tubular members of the respective resilient couplers. If the inertia member 190 or the seismometer S has become stuck in the well, the pistons 175 and 275 may also be pulled rapidly against the shoulders 123 and 223 to assist in jarring them loose.

While the invention has been described above only with reference to the employment of a coupling unit which comprises a resilient coupler, an inertia member, another resilient coupler and a seismometer connected together in the order named, it will be understood that other types of coupling units may be employed without departing from the principles of this invention. For example, a larger number of resilient members and inertia members may be employed. In this case, if preloaded springs are employed in the inertia members, the degree of preloading may be set at a higher value for each spring compared to the one below it so that each of the springs is opened by the load carried beneath it without, however, increasing the length of the string unduly. In any event, each resilient coupler and inertia member, counting the seismometer S itself as an inertia member, may be considered as a section of a mechanical filter. Broadly speaking, the larger the number of filter sections employed, the more effective is the filtering action attainable and the greater is the attenuation of frequency components of cable waves obtainable above the cut-off frequency of the filter.

Though the invention has been described herein only with reference to a method of well-shooting, it will be understood that it is also applicable to other methods of seismic prospecting. In any event, it will now be obvious to those skilled in the art that the invention is not limited to the particular use thereof described herein, but is capable of many other uses and, furthermore, it is not limited to the specific embodiment thereof that has been described, but is capable of a variety of mechanical embodiments. Various changes will now suggest themselves to those skilled in the art may be made in the material form, details of construction and arrangement of the elements, without departing from the principles of the invention. It is therefore intended that the invention shall not be limited to the specific form or use thereof described herein, but that it shall include all forms and uses thereof falling within the scope of the appended claims.

What is claimed is:

1. In combination, an instrument firmly supported in an elongated cylindrical housing adapted to be lowered into a well, said instrument having a pair of output terminals at which electric waves are generated in response to phenomena occurring in liquid in which the instrument is immersed in the well, means including a cable for suspending said instrument in a well, said cable comprising insulated conductors, and a coupling device connecting said instrument to the lowermost end of said cable, said coupling device including a tubular cylindrical resilient member connecting said instrument and said cable mechanically, whereby said instrument is resiliently supported by said cable, and also including conductors passing through said tubular resilient member for connecting said output terminals to said cable conductors, said conductors having sufficient slack therein to permit said resilient member to extend and contract freely, said housing and said coupling device having about the same external diameter to form a continuous, substantially cylindrical member that may be readily raised and lowered in the well.

2. In combination, a seismometer firmly supported in an elongated cylindrical housing adapted to be lowered into a well, said seismometer having a pair of output terminals at which electric waves are generated in response to seismic waves entering liquid in which the seismometer is immersed, means including a cable for suspending said seismometer in a well, said cable comprising insulated conductors, said cable being capable of transmitting disturbing vibrations in a predetermined frequency range to its lowermost end, and a coupling device connecting said seismometer to the lowermost end of said cable, said coupling device including a closed tubular resilient member connecting said seismometer and said cable mechanically, whereby said seismometer is resiliently supported by said cable to attenuate said vibrations, the space within said tubular member providing a longitudinally extending passage that is closed against radial ingress and egress of material and also including conductors passing longitudinally through said tubular resilient member for connecting said output terminals to said cable conductors, said conductors having sufficient slack therein to permit said resilient member to extend and contract freely.

3. In apparatus for seismic prospecting a well-survey unit comprising: an elongated seismometer including means for generating electric waves in response to seismic waves entering liquid in which the seismometer is immersed; and an elongated coupling device including a connector at one end thereof for making mechanical and electrical connection to a cable, and also including an elongated tubular resilient member connecting said seismometer and said connector, said resilient member and said seismometer having a mechanical resonant frequency of about one cycle per second, said seismometer and said tubular resilient member having similar substantially cylindrical external cross-sections to facilitate raising and lowering said unit in a well.

4. In apparatus for seismic prospecting, a well-survey unit comprising: a seismometer including means for generating electric waves in response to seismic waves entering liquid in which the seismometer is immersed; and a coupling device connected to one end of said seismometer, said coupling device including connector means for making mechanical connection to a cable and terminals for making electrical connection with conductors of said cable, said coupling device also including a tubular resilient member connecting said seismometer and said connector means, said resilient member and said seismometer having a mechanical resonant frequency of about one cycle per second, said coupling device also including electrical conductors connecting the output of said seismometer to said cable conductors, said seismometer and said tubular resilient member having similar substantially cylindrical external cross-sections to facilitate raising and lowering said unit in a well.

5. In a coupler for connecting an instrument having outlet terminals to a cable having a plurality of conductors, first and second rigid coaxial tubular members, a resilient tubular member interconnecting said rigid tubular members, the external diameters of said three tubular members being about the same to form a continuous substantially cylindrical unit, means for attaching one of said rigid tubular members to said cable, and means for attaching the other of said rigid tubular members to said instrument.

6. In a coupler for connecting an instrument having outlet terminals to a cable having a plurality of conductors, first and second coaxial tubular members, resilient means connecting said tubular members, means for attaching one of said tubular members to said cable, means for attaching the other of said tubular members to said instrument, and stretch-limit means for restricting the degree of extension of said resilient means.

7. In a coupler for connecting an instrument having outlet terminals to a cable having a plurality of conductors, first and second coaxial tubular members, a coil spring interconnecting said tubular members and arranged coaxially therebetween, a flexible sleeve member connected to said tubular members and enclosing said spring, the external diameters of said sleeve and said tubular members being about the same to form a continuous substantially cylindrical unit, means for attaching one of said tubular members to said cable, and means for attaching the other of said tubular members to said instrument.

8. In a coupler for connecting an instrument having outlet terminals to a cable having a plurality of conductors, first and second coaxial tubular members, a coil spring interconnecting said tubular members and arranged coaxially therebetween, a flexible sleeve member connected to said tubular members and enclosing said spring, means for connecting a relatively stiff rod member to one of said tubular members, said rod member extending through said spring, the other tubular member having an inwardly projecting shoulder, a piston slidable in said other tubular member, said piston being attached to said rod member and being engageable by said shoulder when said tubular members are drawn apart, means for attaching one of said tubular members to said cable, and means for attaching the other of said tubular members to said instrument.

9. In a coupler for connecting an instrument having outlet terminals to a cable having a plurality of conductors, first and second coaxial rigid tubular members, a resilient tubular means interconnecting said tubular members, the external diameters of said three tubular members being about the same to form a continuous substantially cylindrical unit, means for attaching one of said tubular members to said cable, means for attaching the other of said tubular members to said instrument, and electrical conductors extending through said resilient tubular means for connecting the terminals of said instrument to the conductors of said cable.

10. In a coupler for connecting an instrument having outlet terminals to a cable having a plurality of conductors, first and second coaxial rigid tubular members having about equal outer diameters, a coil spring interconnecting said tubular members and arranged coaxially therebetween, the outer diameter of said coil spring being about equal to the outer diameters of said rigid tubular members, means for attaching one of said tubular members to said cable, means for attaching the other of said tubular members to said instrument, and electrical conductors extending through said tubular members and said coil spring for connecting the terminals of said instrument to the conductors of said cable.

11. In a coupler for connecting an instrument having outlet terminals to a cable having a plurality of conductors, an upper tubular member, a lower tubular member having a downwardly facing shoulder and a cylinder formed therebelow, resilient tubular means interconnecting said tubular members, a relatively stiff rod member extending through said tubular means, means for connecting the upper end of said relatively stiff rod member to said upper tubular member, a piston connected to the lower end of said rod member and slidable in said cylinder, means for attaching said upper tubular member to said cable, and means for attaching said lower tubular member to said instrument.

12. In a coupler for connecting an instrument having outlet terminals to a cable having a plurality of conductors, an upper tubular member, a lower tubular member having a downwardly facing shoulder and a cylinder formed therebelow, resilient tubular means interconnecting said tubular members, a relatively stiff rod member extending through said tubular means, means for connecting the upper end of said relatively stiff rod member to said upper tubular member, a piston connected to the lower end of said rod member and slidable in said cylinder, said piston being formed in part by an external rubber ring slidably engaging the wall of said lower tubular member, means for attaching said upper tubular member to said cable, and means for attaching said lower tubular member to said instrument.

13. In a coupler for connecting an instrument having outlet terminals to cable having a plurality of conductors, an upper tubular member, a lower tubular member having a downwardly facing shoulder and a cylinder formed therebelow, tubular resilient means interconnecting said tubular members, a relatively stiff rod member extending through said tubular resilient means, means for connecting the upper end of said relatively stiff rod member to said upper tubular member, a piston connected to the lower end of said rod member and slidable in said cylinder, said piston being formed with a longitudinal passage therein, means for attaching said upper tubular member to said cable, means for attaching said lower tubular member to said instrument, and electrical conductors extending through said tubular members, said tubular resilient means, and said piston for connecting the terminals of said instrument to the conductors of said cable.

14. In a coupler for connecting an instrument having outlet terminals to a cable having a plurality of conductors, an upper tubular member, a lower tubular member having a downwardly facing shoulder and a cylinder formed therebelow, a coil spring interconnecting said tubular members and arranged coaxially therebetween, a flexible sleeve member connected to said tubular members and enclosing said spring, a relatively stiff rod member extending through said spring and said sleeve member, means for connecting the upper end of said relatively stiff rod member to said upper tubular member, a piston connected to the lower end of said rod member and slidable in said cylinder, means for attaching said upper tubular member to said cable, and means for attaching said lower tubular member to said instrument.

15. In a coupler for connecting an instrument having outlet terminals to a cable having a plurality of conductors, an upper tubular member, a lower tubular member having a downwardly facing shoulder and a cylinder formed therebelow, a coil spring interconnecting said tubular members and arranged coaxially therebetween, a flexible sleeve member connected to said tubular members and enclosing said spring, a relatively stiff rod member extending through said spring and said sleeve member, means for connecting the upper end of said relatively stiff rod member to said upper tubular member, a piston connected to the lower end of said rod member and slidable in said cylinder, said piston being formed with a longitudinal passage therein, means for attaching said upper tubular member to said cable, means for attaching said lower tubular member to said instrument, and electrical conductors extending through said tubular members, said piston and said coil spring for connecting the terminals of said instrument to the conductors of said cable.

16. In a coupler for connecting an instrument having outlet terminals to a cable having a plurality of conductors, first and second coaxial rigid tubular members, a resilient tubular member interconnecting said rigid tubular members, external electrical terminals attached to said first rigid tubular member, external electrical terminals attached to said second rigid tubular member, electrical conductors extending loosely through said resilient tubular member for connecting corresponding terminals on the respective rigid tubular members, means for attaching one of said rigid tubular members to said cable, and means for attaching the other of said rigid tubular members to said instrument.

17. In a coupler for connecting an instrument having outlet terminals to a cable having a plurality of conductors, first and second coaxial rigid tubular members, a resilient tubular member interconnecting said rigid tubular members, external electrical terminals attached to said first rigid tubular member, external electrical terminals attached to said second rigid tubular member, electrical conductors extending loosely through said resilient tubular member for connecting corresponding terminals on the respective rigid tubular members, stretch-limit means for restricting the degree of extension of said resilient tubular member, means for attaching one of said rigid tubular members to said cable, and means for attaching the other of said rigid tubular members to said instrument.

18. In a coupler for connecting an instrument having outlet terminals to a cable having a plurality of conductors, first and second tubular members, a coil spring interconnecting said tubular members and arranged coaxially therebetween, a flexible sleeve member connected to said tubular members and enclosing said spring, said sleeve member being in intimate contact with the turns of the said spring, electrical terminals attached to said first tubular member, electrical terminals attached to said second tubular member, electrical conductors extending through said tubular members, for connecting corresponding terminals on the respective tubular members, means for attaching one of said tubular members to said cable, and means for attaching the other of said tubular members to said instrument.

19. In a coupler for connecting an instrument having outlet terminals to a cable having a plurality of conductors, an upper tubular member, a lower tubular member having a downwardly facing shoulder and a cylinder formed therebelow, a coil spring interconnecting said tubular members and arranged coaxially therebetween, a flexible sleeve member connected to said tubular members and enclosing said spring, a relatively stiff rod member extending through said spring and said sleeve member, means for connecting the upper end of said relatively stiff rod member to said upper tubular member, a piston connected to the lower end of said rod member and slidable in said cylinder, said piston being formed with a longitudinal passage therein, electrical conductors extending through said tubular members for connecting corresponding terminals on the respective tubular members, means for attaching one of said tubular members to said cable, and means for attaching the other of said tubular members to said instrument.

20. In combination, a geophysical instrument for use in a bore hole, first and second rigid cylindrical members, a resilient cylindrical member interconnecting said rigid cylindrical members, the external diameters of said three cylindrical members being about the same to form a continuous substantially cylindrical unit, one of said rigid cylindrical members being attached to said instrument, and a cable attached to the other of said rigid cylindrical members.

21. In combination, a geophysical instrument for use in a bore hole, a first cylindrical member, a cable attached to the upper end of said first cylindrical member, a second cylindrical member having a downwardly facing shoulder and a cylinder formed therebelow, a coil spring interconnecting said cylindrical members and arranged coaxially therebetween, a flexible sleeve member connected to said cylindrical members and enclosing said spring, a relatively stiff rod member extending through said spring and said sleeve member, means for connecting the upper end of said relatively stiff rod member to said first cylindrical member, and a piston connected to the lower end of said rod member and slidable in said cylinder, said piston being formed with a longitudinal passage therein, said geophysical instrument being connected to the lower end of said second cylindrical member.

22. In a coupler for connecting an instrument having outlet terminals to a cable having a plurality of conductors, first and second coaxial tubular members, a coil spring interconnecting said tubular members and arranged coaxially therebetween, a flexible sleeve member connected to said tubular members and enclosing said spring and compressed against said spring, means for attaching one of said tubular members to said cable, and means for attaching the other of said tubular members to said instrument.

References Cited in the file of this patent
UNITED STATES PATENTS

| 2,440,903 | Massa | May 4, 1948 |
| 2,465,696 | Pasley | Mar. 29, 1949 |
| 2,498,589 | Steinke | Feb. 21, 1950 |
| 2,590,531 | McLoad | Mar. 25, 1952 |
| 2,605,315 | Hargett | July 29, 1952 |
| 2,681,442 | Schurman | June 15, 1954 |

UNITED STATES PATENT OFFICE
CERTIFICATE OF CORRECTION

Patent No. 2,788,510                          April 9, 1957

Edgar T. Howes

It is hereby certified that error appears in the printed specification of the above numbered patent requiring correction and that the said Letters Patent should read as corrected below.

Column 6, line 9, after the syllable "most" insert -- seismometer --; line 20, for "44a" read -- 40a --; column 7, lines 1 and 54, for "C. P. S.", each occurrence, read -- cps --; column 11, line 44, after "changes" insert -- which --; column 14, line 6, after "to" insert -- a --.

Signed and sealed this 11th day of April 1961.

(SEAL)
Attest:
ERNEST W. SWIDER
Attesting Officer

ARTHUR W. CROCKER
                                      Acting Commissioner of Patents